M. MERLISS.
DRILL PRESS.
APPLICATION FILED DEC. 1, 1913.
1,125,147.
Patented Jan. 19, 1915.
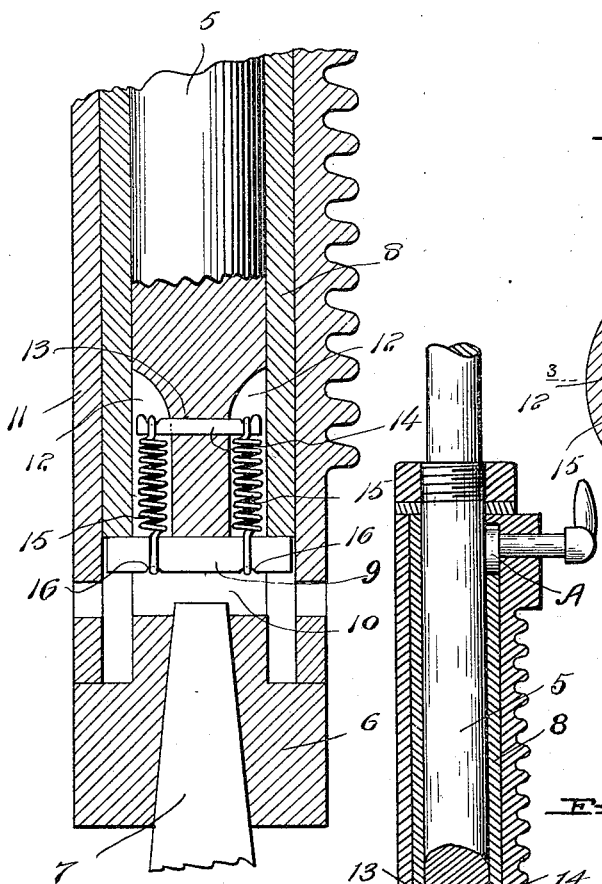
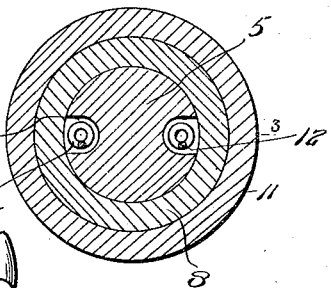
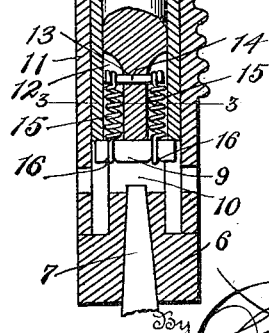
Witnesses
Chas. E. Kemper,
Frank S. Ratcliffe
Inventor
M. Merliss
By Chandlee & Chandlee
Attorneys

UNITED STATES PATENT OFFICE.

MORDUCK MERLISS, OF FLINT, MICHIGAN, ASSIGNOR OF ONE-HALF TO CLAUDE R. TROMLEY, OF DETROIT, MICHIGAN.

DRILL-PRESS.

1,125,147. Specification of Letters Patent. Patented Jan. 19, 1915.

Application filed December 1, 1913. Serial No. 804,010.

*To all whom it may concern:*

Be it known that I, MORDUCK MERLISS, a citizen of the United States, residing at Flint, in the county of Genesee, State of Michigan, have invented certain new and useful Improvements in Drill-Presses; and I do hereby declare the following to be a full, clear, and exact description of the invention, such as will enable others skilled in the art to which it appertains to make and use the same.

This invention relates to new and useful improvements in drill presses and has particular reference to means for the purpose of readily removing the tapered shank of a tool from the spindle of the drill press.

The object of the present invention is to improve the structure embodied in my copending application for patent filed Nov. 5, 1912, Sr. No. 729,672 and resides particularly in the provision of novel means for resiliently urging the tool shank engaging member away from the tool shank.

A further object resides in the provision of such resilient means as are efficient and durable in operation and may be associated with the various parts of the structure embodied in my previous application in a manner conducive to simplicity and cheapness of manufacture.

With these and other objects in view, the invention resides in the novel combination, formation and arrangement of parts to be hereinafter more fully described and illustrated in the accompanying drawings and particularly pointed out in the claims hereto appended.

Reference is had to the accompanying drawings wherein similar characters of reference designate corresponding parts throughout the several views, and in which:

Figure 1 is a vertical sectional view through a drill press equipped with my improved spring means. Fig. 2 is a fragmentary enlarged view of the lower portion thereof, and Fig. 3 is a cross sectional view on the line 3—3 of Fig. 2.

Referring now more particularly to the accompanying drawings, 5 designates the spindle having at its lower end the hollow squared head 6 for receiving the shank 7 of a tool. Surrounding the spindle is the sleeve 8 having diametrically alined slots carrying the key 9 which is slidable in a slot 10 in the spindle. The usual outer sleeve 11 surrounds the sleeve 8. The above parts are those embodied in my previous application. It is seen that the tool shank 7 extends into the slot 10 and that upon downward movement of the sleeve 8 by means of the cam A the key 9 will be forced against the end of the shank to loosen it in the head and allow it to drop out.

The improved means for resiliently holding the key and sleeve away from the tool shank 7 consists in cutting diametrically opposed semi-circular grooves 12 in the spindle. These grooves extend from the slot 10 a suitable distance up the spindle. Connecting the upper portion of the groove is a transverse passage 13 in which is seated a pin 14 having its ends extended into said groove. Tension springs 15 are provided and have their upper ends secured to the ends of the pin and have their lower ends passed around the key, said lower ends being seated in grooves 16 in the key to prevent their displacement.

From the foregoing it is observed that a very simple means has been provided for resiliently urging the key and sleeve away from the head of the spindle, said means being obviously simpler than those embodied in the previous application, afore-mentioned.

What is claimed is:

1. In a drill press, a spindle having a head provided with a tapered shank receiving socket, said spindle being further provided with a transverse slot communicating with the socket and with longitudinal grooves communicating with the slot, a key slidable in the slot, a pin transversely passed through the spindle above the slot and having its ends disposed in the grooves, tension springs in the grooves having their ends secured to the pin and to the key, and means for forcing said key downwardly.

2. In a drill press, a spindle having a head provided with a tapered shank receiving socket, said spindle being further provided with a transverse slot communicating with the socket and also provided with longitudinal grooves communicating with the slot, a sleeve surrounding said spindle, a key slidable in the slot, a pin extending transversely through the spindle above the slot and having its ends disposed in the grooves, tension springs in the grooves having their ends secured to the pin and to the key, and means for forcing said key downwardly against the bottom of said slot, said means comprising the engagement of said sleeve with said key and mechanism for forcing said sleeve downwardly.

In testimony whereof, I affix my signature, in the presence of two witnesses.

MORDUCK MERLISS.

Witnesses:
WILLIAM T. HYNES,
P. E. ARMOR.